(12) United States Patent
Augenstein

(10) Patent No.: US 11,225,337 B2
(45) Date of Patent: Jan. 18, 2022

(54) PARALLEL CALCULATION OF SATELLITE ACCESS WINDOWS AND NATIVE PROGRAM IMPLEMENTATION FRAMEWORK

(71) Applicant: Planet Labs TB, Inc., San Francisco, CA (US)

(72) Inventor: Sean Augenstein, Burlingame, CA (US)

(73) Assignee: Planet Labs TB, Inc., San Francisco, CA (US)

( * ) Notice: Subject to any disclaimer, the term of this patent is extended or adjusted under 35 U.S.C. 154(b) by 845 days.

(21) Appl. No.: 15/681,634

(22) Filed: Aug. 21, 2017

(65) Prior Publication Data

US 2017/0341778 A1    Nov. 30, 2017

Related U.S. Application Data

(63) Continuation of application No. 14/585,895, filed on Dec. 30, 2014, now Pat. No. 9,738,403.

(60) Provisional application No. 61/921,812, filed on Dec. 30, 2013, provisional application No. 61/921,800, filed on Dec. 30, 2013.

(51) Int. Cl.
| | |
|---|---|
| *B64G 1/10* | (2006.01) |
| *G06F 9/50* | (2006.01) |
| *G06Q 10/06* | (2012.01) |
| *G06F 9/38* | (2018.01) |

(52) U.S. Cl.
CPC ......... *B64G 1/1021* (2013.01); *B64G 1/1085* (2013.01); *G06F 9/3887* (2013.01); *G06F 9/505* (2013.01); *G06F 9/5038* (2013.01); *G06Q 10/0631* (2013.01); *G06Q 10/06314* (2013.01); *B64G 2001/1028* (2013.01)

(58) Field of Classification Search
CPC .......... B64G 1/1085; B64G 2001/1028; B64G 1/1021
See application file for complete search history.

(56) References Cited

U.S. PATENT DOCUMENTS

| | | | |
|---|---|---|---|
| 5,911,389 A | 6/1999 | Drake | |
| 5,978,653 A | 11/1999 | Taylor et al. | |
| 5,987,363 A | 11/1999 | Quan et al. | |
| 6,167,263 A * | 12/2000 | Campbell | ................ B64B 1/06 244/164 |

(Continued)

FOREIGN PATENT DOCUMENTS

| | | |
|---|---|---|
| CN | 102322850 | 1/2012 |
| CN | 102354288 | 2/2012 |

(Continued)

OTHER PUBLICATIONS

Angelis et al., (hereinafter: Angelis), DAG Scheduling for Grid Computing Systems:, University of Udine—Italy, Department of Mathematics and Computer Science, 2006. (Year: 2006).

(Continued)

*Primary Examiner* — Kretelia Graham
(74) *Attorney, Agent, or Firm* — Dorrity & Manning, P.A.

(57) ABSTRACT

Systems and methods are provided for calculating satellite access windows for a constellation of imaging satellites. In some implementations, systems and methods are provided for managing execution of native programs on high performance computing systems.

19 Claims, 8 Drawing Sheets

(56) References Cited

U.S. PATENT DOCUMENTS

| | | | |
|---|---|---|---|
| 6,241,192 B1 | 6/2001 | Kondo | |
| 6,491,257 B1 | 12/2002 | Emmons, Jr. et al. | |
| 6,502,790 B1 | 1/2003 | Murphy | |
| 6,512,920 B1 | 1/2003 | Yaoya | |
| 6,606,529 B1 | 8/2003 | Crowder, Jr. et al. | |
| 6,738,346 B1 | 5/2004 | Prieto et al. | |
| 7,002,918 B1 | 2/2006 | Prieto, Jr. et al. | |
| 7,542,829 B2 | 6/2009 | Lee et al. | |
| 8,667,450 B2* | 3/2014 | Wang | G06F 30/398 716/136 |
| 8,913,528 B2 | 12/2014 | Cheng et al. | |
| 8,997,619 B2 | 4/2015 | Sasaki et al. | |
| 9,126,700 B2 | 9/2015 | Ozkul et al. | |
| 9,132,925 B2 | 9/2015 | Korb | |
| 9,811,849 B2* | 11/2017 | Bursey | H04L 67/10 |
| 9,823,900 B2* | 11/2017 | Ouali | G06F 8/10 |
| 2003/0095181 A1 | 5/2003 | LeCompte | |
| 2004/0158832 A1* | 8/2004 | Chechik | G01C 11/025 718/102 |
| 2008/0255908 A1 | 10/2008 | Smith et al. | |
| 2009/0171700 A1 | 7/2009 | O'Sullivan et al. | |
| 2010/0119053 A1 | 5/2010 | Goeldi | |
| 2010/0309313 A1 | 12/2010 | Antikidis | |
| 2010/0311417 A1 | 12/2010 | Korb et al. | |
| 2011/0115793 A1 | 5/2011 | Grycewicz | |
| 2011/0188548 A1 | 8/2011 | Antikidis | |
| 2011/0268158 A1 | 11/2011 | Miller et al. | |
| 2012/0029812 A1 | 2/2012 | Altwaijry et al. | |
| 2012/0036085 A1 | 2/2012 | Srivastava et al. | |
| 2012/0155329 A1 | 6/2012 | Shaffer et al. | |
| 2012/0188372 A1 | 7/2012 | Tarik et al. | |
| 2012/0254887 A1 | 10/2012 | Rodriguez | |
| 2013/0086072 A1 | 4/2013 | Peng et al. | |
| 2013/0124079 A1 | 5/2013 | Oliver et al. | |
| 2013/0275036 A1 | 10/2013 | Olivier et al. | |
| 2014/0027576 A1 | 1/2014 | Boshuizen et al. | |
| 2014/0039963 A1 | 2/2014 | Augenstein et al. | |
| 2014/0040282 A1 | 2/2014 | Mann et al. | |
| 2014/0099884 A1 | 4/2014 | Michael et al. | |
| 2014/0100841 A1* | 4/2014 | Bures | G06F 30/331 703/28 |

FOREIGN PATENT DOCUMENTS

| | | |
|---|---|---|
| CN | 102867107 | 2/2012 |
| CN | 103336715 | 10/2013 |
| EP | 0 992 429 | 4/2000 |
| EP | 2 664 989 | 11/2013 |
| WO | WO 97/26187 | 7/1997 |
| WO | WO 2004/048197 | 6/2004 |
| WO | WO 2011/089477 | 7/2011 |
| WO | WO 2014/022810 | 2/2014 |

OTHER PUBLICATIONS

J.C. Pemberton et al. "On the Need for Dynamic Scheduling of Imaging Satellites", Department of Computer Science, Drexel University, Philadelphia, PA, Pecora 15/Land Sateillite Information IV/ISPRS Commission I/FIEOS 2002 Conference Proceedings. (Year: 2002).

PCT Search Report and Written Opinion in PCT/US2013/053492, dated May 21, 2014—18 pages.

Invitation to Pay Additional Fees in PCT/US2013/053492, dated Feb. 18, 2014—8 pages.

Bataille, "Efficiency and Fairness When Sharing the Use of a Satellite", Proceedings of Fifth International Symposium on Artificial Intelligence, Robotics and Automation in Space, Noordwijk, the Netherlands, Jun. 1-3, 1999, pp. 465-470.

Beaumet et al., "Decision-Making On-Board an Autonomous Agile Earth-Observing Satellite", The International Conference on Automated Planning and Scheduling, Sydney, Australia, Sep. 17, 2008—7 pages.

Bellman, "On a Routing Problem", Notes, vol. XIV, No. 1, 1956, pp. 87-90.

Bensana, "Testing Spacecraft Autonomy with AGATA", Proceedings of the 9$^{th}$ International Symposium on Artificial Intelligence, Robotics, and Automation for Space, Los Angeles, California, Feb. 25-29, 2008—9 pages.

Bogosian, "Image Collection Optimization in the Design and Operation of Lightweight, Low Areal-Density Space Telescopes", Master's Thesis, Massachusetts Institute of Technology, May 23, 2008, 155 pages.

Bouveret et al., "New Constraint Programming Approaches for the Computation of Leximin-Optimal, Solutions in Constraint Networks", Proceedings of the 20$^{th}$ International Joint Conference on Artificial Intelligence, Hyderbad, India, Jan. -12, 2007, pp. 62-67.

Capderou, "Orbit and Ground Track of a Satellite", Chapter 5 from Caperdon, "Satellites: Orbits and Missions", Springer, (c) 2005, pp. 175-263.

Carrel et al., "An Evolutionary Algorithm for Near-Optimal Autonomous Resource Management", Proc. of the 8$^{th}$ International Symposium on Artificial Intelligence, Robotics and Automation in Space—iSAIRAS, Munich, Germany, Sep. 5-8, 2005. (ESA SP-603, Aug. 2005), 8 pages.

Chevaleyre et al., "Issues in Muitiagent Resource Allocation", Informatica, vol. 30, No. 1, 2006, pp. 331.

Christophe et al., "Remote Sensing Processing: From Multicore to GPU", IEEE Journal on Selected Topics in Applied Earth Observations and Remote Sensing, vol. 4, No. 3, Sep. 2011, pp. 243ff.

Dijkstra, "A Note on Two Problems in Connexion with Graphs", Numerische Mathematik, vol. 1, Jun. 1959, pp. 269-271.

Directed Acyclic Graph, http://en.wikipedia.org/wiki/Directed_acyclic_graph, Retrieval Date Aug. 7, 2014—10 pages.

Endriss et al., "Proceedings of the 1$^{st}$ International Workshop on Computational Social Choice", University of Amsterdam, Dec. 2006, 519 pages.

Ford et al., "Flows in Networks", The Rand Corporation, Aug. 1962—332 pages.

Gabrel et al., "A New Single Model and Derived Algorithms for the Satellite Shot Planning Problem Using Graph Theory Concepts", Annals of Operation Research, vol. 69, 1997, pp. 115-134.

Gabrel et al., "Enumeration and Interactive Selection of Efficient Paths in a Multiple Criteria Graph for Scheduling an Earth Observing Satellite", European Journal of Operational Research, vol. 139, Issue 3, 2002, pp. 533-542.

Gabrel et al., "Mathematical Programming for Earth Observation Satellite Mission Planning", Chapter 7, Operations Research in Space and Air, 2003, pp. 103-122.

Gabrel, "Strengthened 0-1 Linear Formulation for the Daily Satellite Mission Planning", Journal of Combinatorial Optimization, vol. 1, Issue 3, Jan. 11, 2006, pp. 341-346.

Harrison et al., "Task Scheduling for Satellite Based Imagery", In Proceedings of the 18$^{th}$ Workshop of the UK Planning and Scheduling Special Interest Group, vol. 78, University of Salford, UK, Dec. 15-16, 1999—15 pages.

Hwang, et al., "Development of a Multi Remote Sensing Satellites Mission Planning System", 28$^{th}$ Asian Conference on Remote Sensing 2007 (ACRS 2007), Kuala Lumpur, Malaysia, Nov. 12-16, 2007, vol. 2 of 3, Paper TS 24.1, pp. 746ff.

Hwang et al., "Multi-Objective Optimization for Multi-Satellite Scheduling System", The 31$^{st}$ Asian Conference on Remote Sensing (ARCS 2010), Hanoi, Vietnam, Paper TS 38,4, 6 pages.

Kim et al, "Generation of Cloud-Free Imagery Using Landsat-8", published as paper SC02-0828 in Proceedings of the 34$^{th}$ Asian Conference on Remote Sensing, ACRS 2013, Oct. 20-24, 2013, Bali, Indonesia, 7 pages.

Lemaitre et al., "How to Manage the New Generation of Agile Earth Observation Satellites?", International Conference on Space Operations, Toulouse, France, Jun. 2000—9 pages.

Lemaitre et al., "Selecting and Scheduling Observations of Agile Satellites", Aerospace Science and Technology, vol. 6, No. 5, Jul. 1, 2002, pp. 367-381.

(56) References Cited

OTHER PUBLICATIONS

Lemaitre et al., "Sharing the Use of Earth Observation Satellites", Proceedings of the 3rd NASA International Workshop on Planning and Scheduling for Space, Houston, Texas, Oct. 27-29, 2002—5 pages.
Lemaitre et al., "Towards the Formal Verification of the Functional Architecture of Autonomous Satellite Onboard Flight Software", $3^{rd}$ National Conference on Control Architectures of Robots, Bourges, May 29-30, 2008, 8 pages.
Li et al., "An Analytical Model to Predict the Probability Density Function of Elevation Angles for LEO Satellite Systems", IEEE Communications Letters, vol. 6, No. 4, Apr. 2002, pp. 138ff.
Mai et al., "Conversion of North American Aerospace Defense Command Elements to Epicycle Elements", Journal of Guidance, Control, and Dynamics, vol. 24, No. 2, Mar.-Apr. 2001, pp. 406ff.
Mai et al., "Fast Algorithm for Prediction of Satellite Imaging and Communication Opportunities", Journal of Guidance, Control, and Dynamics, AIAA, vol. 24, No. 6, Nov.-Dec. 2001, pp. 1118-1124.
Pralet et al., "Controller Synthesis for Autonomous Systems: A Constraint-Based Approach", $10^{th}$ International Symposium on Artificial Intelligence, Robotics and Automation in Space, Saporo, Japan, Aug. 29-Sep. 1 2010,—8 pages.
Schilling, "Mission Analyses for Low-Earth-Observation Missions with Spacecraft Formations", NATO-OTAN Publication RTO-EN-SCI-209, Paper 1, Apr. 2009, 26 pages, downloaded from https://www.cso.nato.int/pubs/rdp.asp?RDP=RTO-EN-SCI-209.
Steyn, "A View Finder Control System for an Earth Observation Satellite", Aerospace Science and Technology, vol. 10, 2006, pp. 248-255.
Third Party Submission—Concise Description of Relevance, Mar. 18, 2015—11 pages.
Verfaillie et al., "How to Model Planning and Scheduling Problems Using Constraint Networks on Timelines", The Knowledge Engineering Review, vol. 25, Special Issue 3, Sep. 2010, pp. 319-336.
Wikipedia Article, "AMID", Old revision dated Dec. 3, 2013, 7 pages.
Wikipedia Article, "Streaming SIMD Extensions", Old revision dated Dec. 27, 2013, 5 pages.
Wu et al., "A Fast Image Prediction Software and its Application in the SSTL Off-Axis Image Scheduling System", $15^{th}$ AIAA/USU Conference on Small Satellites, 2001, Paper SSC01-Villa-1, 10 pages.
Wu et al., "Fast Prediction Algorithms of Satellite Imaging Opportunities with Canted Camera and Altitude Controls", AIAA Guidance, Navigation and Control Conference and Exhibit, Aug. 6-9. 2001, Montreal, Canada, Paper AIAA-2001-4270 (A01-37137), 11 pages.
Yeh et al., "Geometry Arillysis Based Genetic Algorithm for Satellite Imaging Scheduling", Proceedings of the $32^{nd}$ Asian Conference on Remote Sensing, ACRS 2011, Oct. 3-7, 2011, Taipei, Chinese Taipei, 6 pages.

\* cited by examiner

PARALLEL CALCULATION OF SATELLITE ACCESS WINDOWS AND NATIVE PROGRAM IMPLEMENTATION FRAMEWORK

PRIORITY CLAIM

The present application is a continuation of U.S. patent application Ser. No. 14/585,895 having a filing date of Dec. 30, 2014, which is based on and claims priority to U.S. Provisional Application 61/921,812 having a filing date of Dec. 30, 2013 and U.S. Provisional Application 61/921,800 having a filed date of Dec. 30, 2013. Applicant claims priority to and benefit of all such applications and incorporate all such applications herein by reference.

BACKGROUND

Scheduling problems appear in many applications such as satellite scheduling, airline crew scheduling, vehicle routing, traveling salesmen problems, and the like. Applications such as these involve allocating resources to activities over time. Typically, resources are scarce and constrained in various ways (e.g., in the capacity of resources and/or the order of activities). Solving a typical scheduling problem can involve creating a schedule of activities that satisfies the constraints and is optimal according to some criterion. However, adhering to the constraints may solve a typical scheduling problem at the expense of customer satisfaction. Thus, implementing a schedule can include finding a desirable solution to a scheduling problem accounting for various constraints, communicating the desirable solution to the appropriate people or systems, and/or executing the schedule as communicated.

Further, execution of native programs in other, non-native platforms may present problems for program execution, data processing, progress tracking, logging, task cancellation, etc. Moreover, efficiency of execution of native programs that process large-scale data is especially challenging, because the native programs may utilize methods that solve efficiency issues that cannot be duplicated in other platforms.

SUMMARY

The systems, methods and devices described herein have innovative aspects, no single one of which is indispensable or solely responsible for their desirable attributes. Without limiting the scope of the claims, some of the advantageous features will now be summarized.

One goal in calculating satellite access windows for a constellation of imaging satellites is reducing overall computation time. By reducing overall computation time, the imaging satellite control systems can be free to perform other tasks.

Another goal is to increase customer satisfaction by responding to and/or processing imagery collection requests in a timely manner. Requests for images can change rapidly and it would be advantageous to be able to determine more quickly when various imaging satellites will be available to captured the requested images.

Accordingly, provided herein are systems and methods for calculating satellite access windows for a constellation of imaging satellites. The systems and methods presented can utilize a hardware processor to determine positions of various imaging satellites in one coordinate system and transform the positions into a second coordinate system. The systems and methods presented can further utilize one or more graphical (or graphics) processing units (GPUs) that execute instructions in parallel to determine whether a particular imaging satellite can view a desired location. For example, the one or more GPUs can execute a single instruction for some or all of the data in a large volume of data at the same or nearly the same time.

The disclosure is further related to systems and methods for implementing native programs independent of any underlying data storage and processing platform, and more particularly for an implementation framework for native program execution on high performance distributed computing systems.

An embodiment of a computing system configured to manage execution of native programs is provided. The system comprises one or more physical computing devices having a hardware processor and a computer memory, the computer memory configured to store one or more program modules for executing native programs. The system comprises an implementation framework system stored in a computer memory, wherein the implementation framework system is configured to automatically access a request from a user to execute native programs on a high performance computing system, wherein the high performance computing system comprises a plurality of physical computing nodes; configure one or more input byte arrays to store input of the native programs; configure one or more output byte arrays to store output of the native programs; create a configuration file that identifies the native programs, the input byte arrays, the output byte arrays, and an iterator; and communicate with one or more modules for progress reporting, logging, and/or job control on the high performance computing system; and execute the native programs on the high performance computing system.

An embodiment of a computer implemented method for managing execution of native programs is provided. The method comprises performing, under control of an implementation framework system stored in a computer memory and configured to communicate with a high performance computing system, the actions of: automatically accessing a request from a user to execute native programs on a high performance computing system, wherein the high performance computing system comprises a plurality of physical computing nodes; configuring one or more input byte arrays to store input of the native programs; configuring one or more output byte arrays to store output of the native programs; creating a configuration file that identifies the native programs, the input byte arrays, the output byte arrays, and an iterator; communicating with one or more modules for progress reporting, logging, and/or job control on the high performance computing system; and executing the native programs on the high performance computing system.

In some implementations, non-transitory computer storage comprises computer-executable instructions that, when executed by a computing system, cause the computing system to perform embodiments of the methods for managing programs (and/or any other methods or processes disclosed herein).

These and other features, aspects and advantages of the present disclosure will become better understood with reference to the following description and appended claims.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Figure 1:
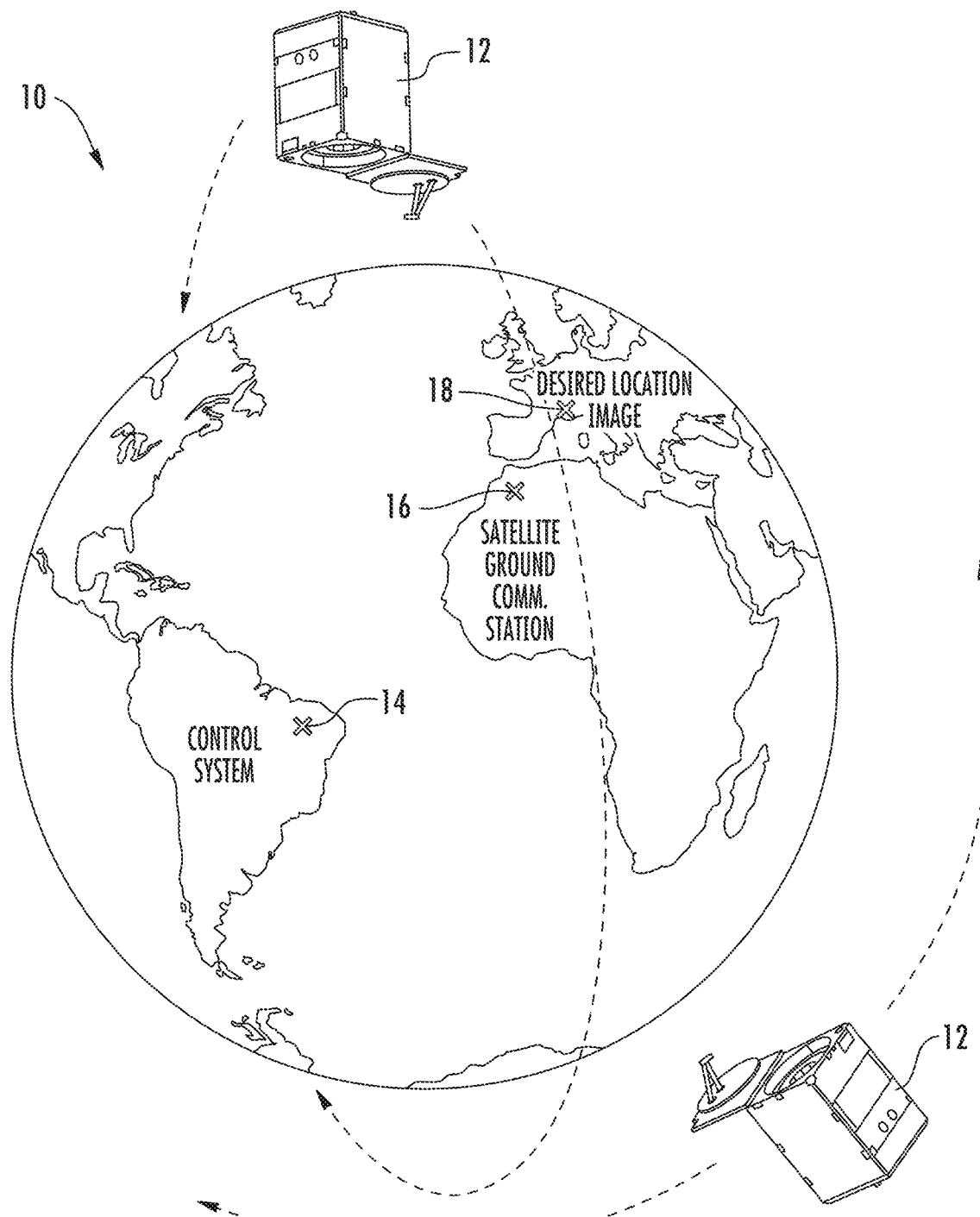
FIG. 1 illustrates a representation of an example constellation of imaging micro-satellites in a low-earth orbit, a control system, a ground communication system, and a desired location area.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

This disclosure is directed to systems and methods for calculating satellite access windows for a constellation of imaging satellites. In some implementations, the disclosed systems and methods can be used to determine access windows for imaging and downlink. In some implementations, an access window represents a time period and an orientation angle in which a specific imaging satellite has an unobstructed view of a particular region on the Earth's surface. In some implementations, a computational time taken to determine access windows can be reduced via the use of one or more graphical processing units (GPUs) that use parallel computing to execute a same instruction on some or all of the data in a large volume of data at the same or nearly the same time. For example, one or more GPUs can be configured to determine, using parallel computing, whether an imaging satellite is within the visibility cone of a desired location for each desired location in a desired location deck.

Also described herein are systems and related methodologies that increase or maximize utilization of one or more controllable objects by constructing near-optimal or optimal schedules of events. It will be understood that although much of the description herein is in the context of scheduling satellites, one or more features of the present disclosure can also be implemented in systems where finding near-optimal schedules in a fast and efficient manner may be more desirable than finding the most optimal schedule or the schedule that maximizes a particular utilization or cost function. For example, some embodiments of the systems and related methodologies disclosed herein can be used in image processing (e.g., images or video produced by imaging satellites, aerial vehicles, etc.), processing customer-uploaded image or video data, processing scanned documents, consumer behavior data analysis, DNA/Protein data analysis, large-scale machine learning projects, and the like.

Unless explicitly indicated otherwise, terms as used herein will be understood to imply their customary and ordinary meaning. For example, pair-wise constraint is a broad term and is to be given its ordinary and customary meaning to a person of ordinary skill in the art (e.g., it is not to be limited to a special or customized meaning), and includes, without limitation, constraints that prohibit an event based solely on properties of an immediately preceding event. For example, two image collection events are pair-wise constrained if there is insufficient time between the first image collection event and the second image collection event to change a pointing direction of an imaging satellite to perform the second image collection event.

Cumulative constraint is a broad term and is to be given its ordinary and customary meaning to a person of ordinary skill in the art (e.g., it is not to be limited to a special or customized meaning), and includes, without limitation, constraints that prohibit an event based on properties of preceding events. For example, an image collection event can be constrained if by performing the event the temperature of a camera acquiring the image would exceed acceptable temperature limits due at least in part to prior events.

In some implementations, a constellation of satellites can include any type of satellite including but not limited to satellites, mini-satellites, micro-satellites, nano-satellites, and so forth. Micro-satellite is a broad term and is to be given its ordinary and customary meaning to a person of ordinary skill in the art (e.g., it is not to be limited to a special or customized meaning), and includes, without limitation, satellites with a mass less than or equal to about 500 kg and/or physical dimensions less than or equal to about 125 cm×125 cm×175 cm, or satellites that launch as a secondary payload on a launch vehicle. According to some conventions, satellites having a mass less than or equal to about 500 kg are classified as small satellites with further divisions being made based on their mass. For example, in one classification system, small satellites are deemed mini-satellites when they have a mass between about 100 kg and 500 kg, micro-satellites when they have a mass between about 10 kg and 100 kg, nano-satellites when they have a mass between about 1 kg and 10 kg, pico-satellites when they have a mass between about 0.1 kg and 1 kg, and femto-satellites when they have a mass less than or equal to about 100 g. However, any reference to micro-satellite, mini-satellite, or small satellite in this disclosure should be understood to mean the general class of satellites having a mass less than or equal to about 500 kg and/or physical dimensions less than or equal to about 125 cm×125 cm×175 cm; and not to the more specific classification of satellites identified herein or other similar classification schemes.

Overhead image is a broad term and is to be given its ordinary and customary meaning to a person of ordinary skill the in the art (e.g., it is not to be limited to a special or customized meaning) and includes, without limitation, satellite images captured by satellites in earth-orbit, or other overhead images captured by aircraft (e.g., airplanes, helicopters, drones, unmanned aerial vehicles (UAV), balloons, etc.) surveying a geographic region, and the like. In some cases, the overhead image may be of an astronomical object rather than a terrestrial object. Images (or imagery) can include both still images and/or video.

Unless explicitly indicated otherwise, terms as used herein will be understood to imply their customary and ordinary meaning. For example, large-scale data is a broad term and is to be given its ordinary and customary meaning to a person of ordinary skill in the art (e.g., it is not to be limited to a special or customized meaning), and includes, without limitation, any large-scale data that cannot be processed efficiently using traditional computing resources.

Example Network of Imaging Micro-Satellites

FIG. 1 illustrates a representation of an example constellation 10 of imaging micro-satellites 12 in a low-earth orbit, a control system 14, a ground communication system 16, and an example of a desired location image area 18. Embodiments of the systems and methods described herein can be used to schedule events in the constellation 10 including, for example, determining which micro-satellite 12 is to acquire an image of the desired location image area 18, when the image is to be acquired, when the image is to be communicated to the ground communication system 16, and/or other scheduling events. The image can include a plurality of images, video, etc. In some implementations, the imaging micro-satellites 12 can include an image acquisition system configured to acquire multi-spectral and/or pan-spectral images or videos of the desired location image area 18. The imaging micro-satellites 12 can be owned and/or operated by a single entity or multiple entities. In various implementations, the constellation 10 may include 2, 4, 8, 10, 12, 16, 24, 30, or some other number of satellites. Although FIG. 1 shows an example constellation of micro-satellites 12, in other implementations the constellation 10 can include additional or different types of satellites including telecommunications satellites, mini-satellites, and so forth.

The control system 14 can be configured to schedule events in the constellation. For example, the control system 14 can include embodiments of the control system 202 described with reference to FIG. 2. The control system 14, 202 can interface with a pricing and delivery system. Scheduled events can include one or more tasks to be performed, data to be collected, information to be received or transmitted, duration, desired start time, desired end time, desired results, or any combination of these. For example, for an imaging satellite, events can be any task to be performed by the imaging satellite and can generally include, without limitation, imagery collection (e.g., of the desired location image area 18), imagery downlink (e.g., to the satellite ground communication station 16), and onboard maintenance.

The calculation of satellite access windows for a constellation of imaging satellites can be computationally slow. Embodiments of the systems, methods, and algorithms described herein advantageously can be used to reduce the computation time for determining satellite access windows. As an example, the control system 14, 202 can use one or more graphical processing units (GPUs) to execute similar or the same instructions in parallel on a large volume of data. In particular, one or more GPUs can be configured to determine whether an imaging satellite is within the visibility cone of a desired location for each desired location in a desired location deck. The control system 14, 202 can utilize any method described herein for calculating satellite access windows for a constellation of imaging satellites, such as the example method 1300 described herein with reference to FIG. 3.

Example Parallel Satellite Access Window Calculation Systems and Methodologies

As described above, the control system 14, 202 can be configured to schedule events in the constellation 10 of satellites. As part of this process, the control system 14, 202 may determine an access window for the capture and downlink of images by the constellation 10 of satellites. In an embodiment, an access window represents a time period and orientation angle(s) in which a specific satellite has an unobstructed view of a particular region on the surface of a planet (e.g., Earth). The control system 14, 202 may be configured to determine access windows in order to properly schedule events in the constellation 10 of satellites.

Figure 2:
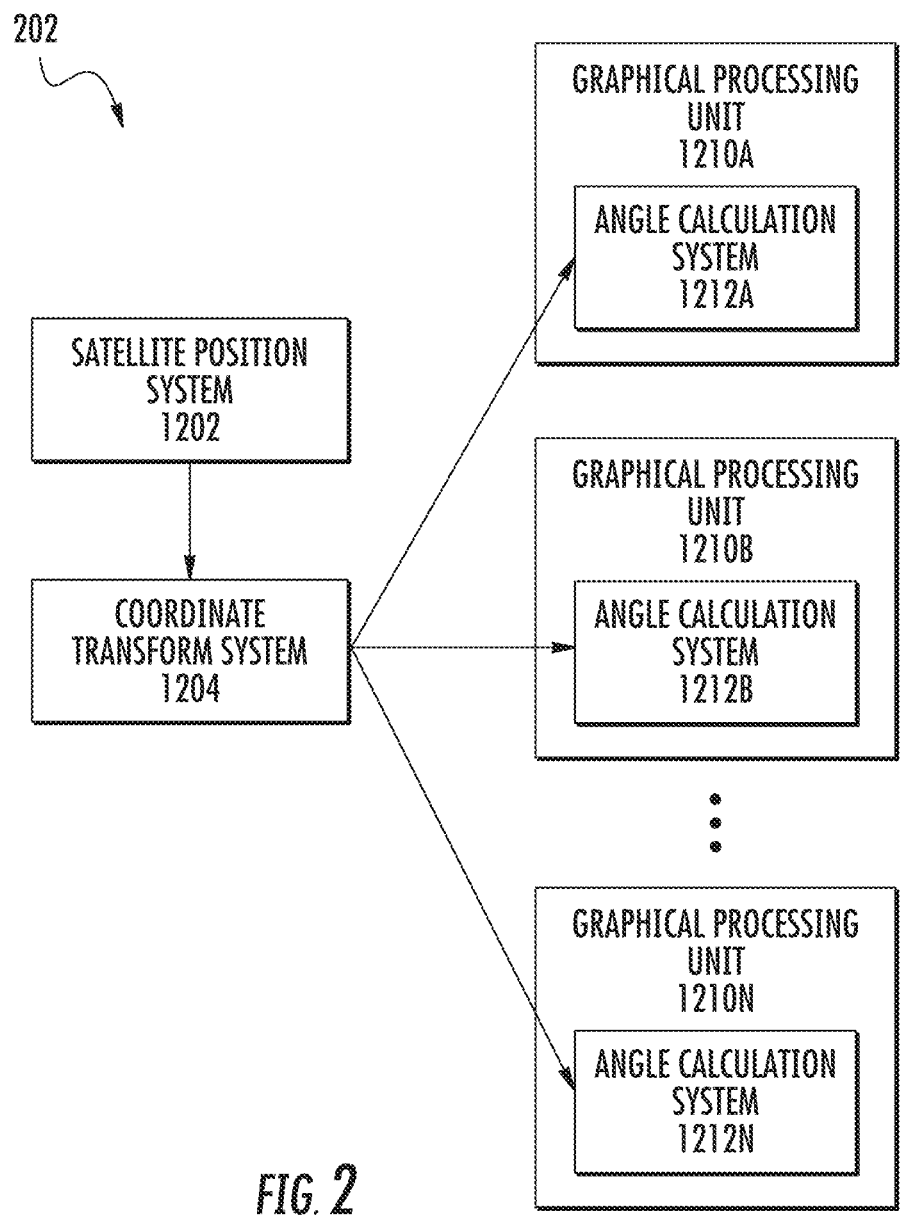
FIG. 2 illustrates a block diagram of an example embodiment of the control system.

FIG. 2 illustrates a block diagram of an example embodiment of the control system 14, 202. As illustrated in FIG. 2, the control system 14, 202 includes a satellite position system 1202, a coordinate transform system 1204, and one or more graphical (or graphics) processing units (GPUs) 1210. One or more of the satellite position system 1202, the coordinate transform system 1204, and the GPUs 1210 can be implemented with one or more computing devices, such as one or more hardware processors that execute one or more instructions. While the satellite position system 1202, the coordinate transform system 1204, and the GPUs 1210 are illustrated as separate components, this is not meant to be limiting. Any combination of the satellite position system 1202, the coordinate transform system 1204, and the GPUs 1210 can be combined into one or more components.

In some embodiments, a determination of access windows by a typical control system for a constellation of M satellites imaging N distinct desired locations on a planet planned over a time horizon of duration K is on the order of O(MNK), where O is the "big O" notation that describes the limiting behavior of a function (e.g., CPU time or number of computer operations) as the argument gets large. Determining access windows on the order of O(MNK) can limit the pace at which new imagery collection requests are processed and a customer is satisfied. However, embodiments of the control system 14, 202 described herein can determine access windows on the order of O(MK) via the use of the one or more GPUs 1210. Accordingly, such embodiments using GPUs can determine access windows about N times faster, which can advantageously improve speed and efficiency since the number of desired locations N may be large.

The GPUs 1210 may each be examples of single instruction, multiple data (SIMD) hardware processors that are configured to execute the same set of instructions many times over for a large volume of data. In some implementations, the GPU may include numerous (e.g., hundreds, thousands or millions) of efficient cores designed for handling multiple tasks simultaneously. A GPU may be different from a conventional central processing unit (CPU), which typically includes a small number of cores (e.g., a few) optimized for sequential serial processing. A GPU may be configured to process numerous (e.g., hundreds, thousands or millions) threads simultaneously (e.g., in a parallel manner), whereas a CPU is typically configured to process a few threads at a time. As described herein, the determination of access windows is an example of a SIMD process.

In an embodiment, the satellite position system 1202 is configured to determine, for each time-step k in the time horizon of duration K, each satellite m's position in an Earth-centered inertial (ECI) frame. The satellite position system 1202 may be configured to determine each satellite m's position on the order of O(M).

In an embodiment, the coordinate transform system 1204 is configured to transform, for each time-step k in the time horizon of duration K, each satellite m's position into an Earth-centered Earth-fixed (ECEF) frame. The satellite position system 1202 and the coordinate transform system 1204 together may be configured to determine and transform each satellite m's position on the order of O(MK).

The GPUs 1210 may each include an angle calculation system 1212 implemented by one or more computing devices, such as one or more hardware processors configured to execute one or more instructions. For each desired location n in the desired location deck N (e.g., the "multiple data"), one or more of the angle calculation systems 1212 may be configured to execute the same instruction (e.g., the "single instruction") to determine the angle at the center of the Earth between a vector to the desired location n and a vector to the satellite m (e.g., using the position of the satellite m determined by the satellite position system 1202 and/or the coordinate transform system 1204) and a logic check to ensure that the determined angle places the satellite m inside a visibility cone of the desired location n. Alternatively, for each desired location n in the desired location deck N, one of more of the angle calculation systems 1212 may be configured to execute the same instruction to determine a line-of-sight vector in ECEF from the desired location n to the satellite m (e.g., using the position of the satellite m determined by the satellite position system 1202 and/or the coordinate transform system 1204) and to perform a logic check to determine whether the azimuth and elevation angles to the line-of-sight vector place the satellite m inside the visibility cone of the desired location n. In some embodiments, a single angle calculation system in a single GPU, such as the angle calculation system 1212A of GPU 1210A, is configured to execute the same instruction for each desired location n in the desired location deck N. In other embodiments, a plurality of angle calculation systems in a plurality of GPUs, such as the angle calculation systems 1212A-B of GPUs 1210A-B, are each configured to execute the same instruction for a certain number of desired location n's in the desired location deck N. Because one of more of the GPUs 1210 execute instructions in a parallel manner (e.g., a single instruction is executed over a plurality of data at the same or nearly the same time), the overall order of computation time to determine an access window can be reduced from O(MNK) to O(MK).

Figure 3:
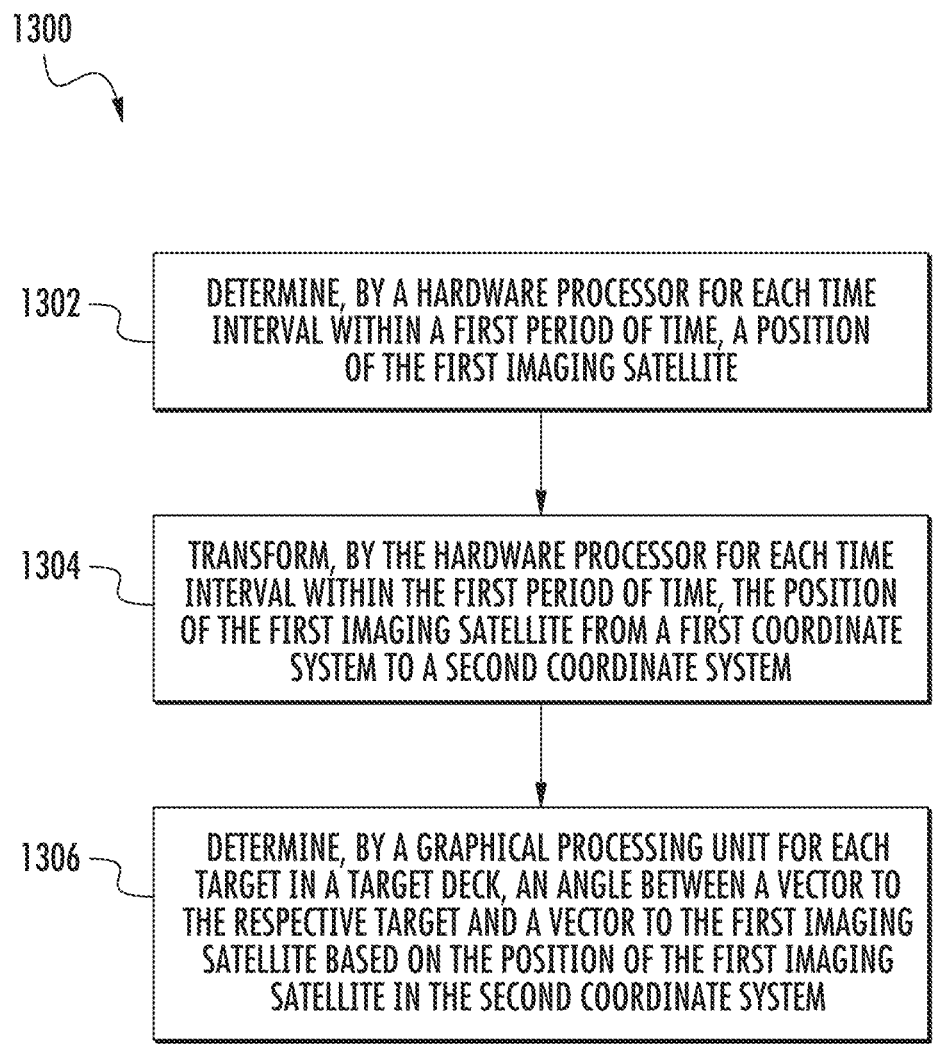
FIG. 3 illustrates a flow chart of an example method for calculating satellite access windows for a constellation of imaging satellites.

Example Method of Calculating Satellite Access Windows for a Constellation of Imaging Satellites FIG. 3 illustrates a flow chart of an example method 1300 for calculating satellite access windows for a constellation of imaging satellites. For ease of description, the blocks in the method 1300 will be described as being performed by the control system 14, 202. Blocks in the method 1300, however, can be performed by various systems or modules or combination thereof.

In block 1302, the control system 14, 202 determines, for each time interval within a first period of time, a position of a first imaging satellite. For example, the control system 14, 202 can determine a position of the first imaging satellite in an ECI frame.

In block 1304, the control system 14, 202 transforms, for each time interval within the first period of time, the position of the first imaging satellite from a first coordinate system to a second coordinate system. For example, the control system 14, 202 can transform the position of the first imaging satellite from an ECI frame into an ECEF frame.

In block 1306, the control system 14, 202 determines, for each desired location in a desired location deck, an angle between a vector to the respective desired location and a vector to the first imaging satellite based on the position of the first imaging satellite in the second coordinate system. Alternatively, the control system 14, 202 determines, for each desired location in the desired location deck, a line-of-sight vector in ECEF from the respective desired location to the position of the first imaging satellite.

Additional Examples and Embodiments

The systems and methods of performing parallel access are not limited to calculating access windows and can be used in other applications. For example, in other embodiments, the methods and systems described herein can be used for selecting, pricing, and/or prioritizing images obtained by a constellation of imaging satellites, such as the constellation 10. The systems and methods presented can determine whether an imagery collection request should be accepted or rejected. If the imagery collection request is accepted, the systems and methods presented can determine an appropriate pricing option for the imagery collection request and how the imagery collection request should be prioritized in relation to other outstanding imagery collection requests. In some such implementations, use of GPUs can advantageously increase the efficiency and performance of these systems and methods.

In other embodiments, the efficient parallel systems and methods can be used for managing execution of native programs on high performance computing systems. The systems and methods presented can utilize an implementation framework system to configure one or more input byte arrays for storing input of the native programs and one or more output byte arrays for storing output of the native programs. A configuration file may be created to identify the native programs, the input array, the output array, an expected dimension, and an iterator. The implementation framework system may communicate with one or more modules for progress reporting, logging, and/or job control on the high performance computing system, and execute the native programs on the high performance computing system. In some such implementations, use of GPUs can advantageously increase the efficiency and performance of these systems and methods.

Examples of Calculating Satellite Access Windows Systems and Methods

In embodiment 1, a system for calculating satellite access windows for a constellation of imaging satellites is provided, the system comprising non-transitory data storage configured to store satellite properties information corresponding to characteristics of a first imaging satellite in the constellation of imaging satellites. The system also includes a computing device in communication with the data storage, the computing device configured to execute: a satellite position system configured to determine, for each time interval within a first period of time, a position of the first imaging satellite; a coordinate transform system configured to transform, for each time interval within the first period of time, the position of the first imaging satellite from a first coordinate system to a second coordinate system; and an angle calculation system configured to determine, for each desired location in a desired location deck, an angle between a vector to the respective desired location and a vector to the first imaging satellite based on the position of the first imaging satellite in the second coordinate system.

In embodiment 2, a method for calculating satellite access windows for a constellation of imaging satellites is provided, the method comprising, under control of a computing device in communication with non-transitory data storage configured to store properties corresponding to characteristics of a first imaging satellite in the constellation of imaging satellites, the computing device comprising a hardware processor and a graphical processing unit, determining, by the hardware processor for each time interval within a first period of time, a position of the first imaging satellite; transforming, by the hardware processor for each time interval within the first period of time, the position of the first imaging satellite from a first coordinate system to a second coordinate system; and determining, by the graphical processing unit for each desired location in a desired location deck, an angle between a vector to the respective desired location and a vector to the first imaging satellite based on the position of the first imaging satellite in the second coordinate system.

Overview of Native Program Execution Framework

Efficient execution of native programs that process large-scale data can be a difficult and challenging problem. One reason is that the native programs may utilize methods that solve efficiency issues that cannot be duplicated in other platforms. Another reason is that some common solutions that try to execute native programs in a different platform breaks the underlying high performance computing environment's ability to schedule tasks, cancel tasks, produce logs, create progress reports, etc. Moreover, trying to re-create native programs in a different programming language or to suit a specific high performance computing environment's specific needs can be highly inefficient.

Additionally, in many situations, native programs that are executable on high performance data platforms may be highly sensitive and therefore, should be protected as such. This is especially true for proprietary native programs. Therefore, solutions that do not have to peek inside the inside mechanisms or do not have to change anything in the native programs are highly desirable.

One area of ever-growing big data processing needs is, for example, geospatial data. Satellite imaging data, for example, may create tetabytes or even petabytes of data in a very short duration of time. Therefore, storing, processing, and efficiently analyzing such data present a unique problem. Many insufficient solutions are developed to attempt to solve such problems. However, such insufficient solutions do not work well with a new generation of data processing platforms, such as distributed high performance computing services. Many such solutions are designed using a specific programming language or are optimized for a specific type of computing platform, making transplantation to another environment very difficult and highly inefficient.

Figure 4:
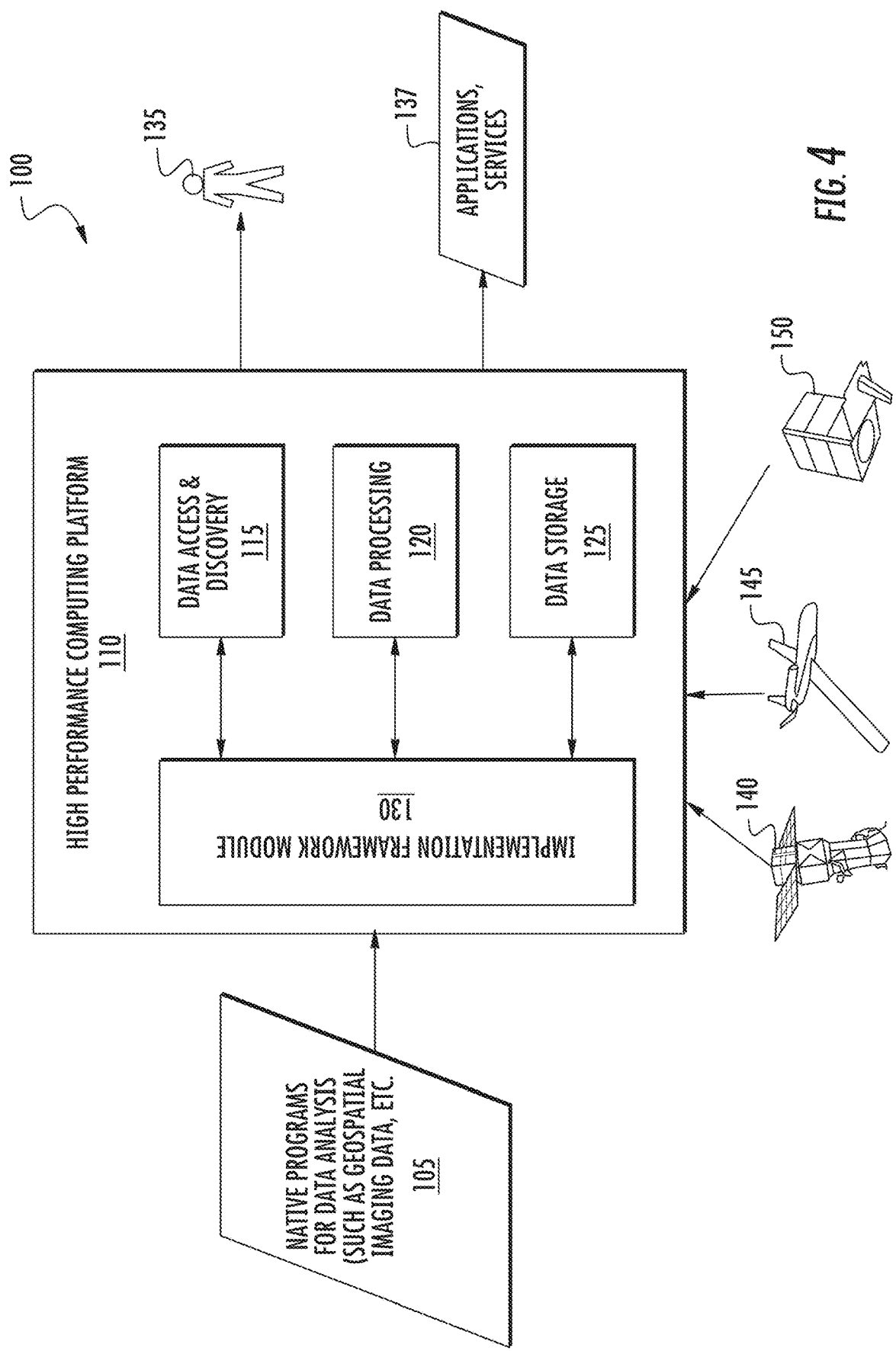
FIG. 4 illustrates a block diagram of an example embodiment of a system for processing geospatial data on a high performance data platform.

FIG. 4 illustrates a block diagram of an example embodiment of a system for processing geospatial data on a high performance computing data platform. The system 100 may receive input geospatial data from various sources. In some embodiments, such input data may be received from satellite 140, plane 145, and/or mini-satellite 150. In some other embodiments, such input data may be received from an existing repository of imaging data. More generally, input data may be received from various other sources such as consumer uploaded data, pre-existing historic data of other types, and so forth.

Depending on the embodiment, the input data received from various data sources may be stored in a remote database and access by a data storage module 125. In some other embodiments, the input data may be stored locally on a high performance computing platform and access by a data storage module 125. In some other embodiments, the data may be partitioned as key-value pairs or other formats and only portions of input data are stored either locally or remotely, and the other portions that are not directly stored may be accessed as needed. Geo-spatial data is especially suitable for being partitioned because such data can be partitioned according to geo-location, time taken, and other standards. Other types of general input data may also be partitioned and accessed in smaller portions. For example, consumer purchase history data may be partitioned based on geo-location, time of purchase, and so forth.

In many situations, native programs 105, including proprietary, open source, specialized programs, for example, for data processing and analysis, may have been developed already to process and analyze specific types of data. For example, existing programs have been written in C/C++ by many institutions, researchers, scientists, business entities, to analyze geo-spatial imaging data. In another example, LISP programs, which are not very common in modern standards, have been written to study nucleotide structure and annealing processes. In yet another example, machine learning programs have been developed in languages such as Perl, Python, Java, and so forth, to analyze various data, such as business data, biology data, financial data, and so forth. Therefore, there is a strong need to execute the native programs 105 directly to take advantage of their memory, CPU, or other types of efficiencies without having to re-write them in order to execute them on a high performance computing platform.

In some embodiments, native programs 105 can be directly executed in parallel or in a distributed way to fully utilize the capabilities of the underlying high-performance computing platform 110. For example, C/C++ programs written for the purpose of image processing cannot be directly executed on the Apache™ Hadoop computing platform, which enables efficient storage and distributed parallel processing of huge amounts of data across inexpensive, industry-standard servers. This is partly due to the fact that Hadoop may require the programs to be executed to be written in particular programming languages, such as Java, and/or require the native programs to be adapted in certain specific ways before they can be deployed or to fully utilize the parallel processing capabilities of the systems. Other high performance computing platforms 110, besides Apache™ Hadoop, also present similar issues to programmers of native programs 105.

In some embodiments, the high performance computing platform 110 may include certain modules and hardware/software components for various purposes such as data access and discovery module 115, data processing module 120, and data storage module 125. Moreover, some high performance computing platforms implement a specific way to store data, such as using key/value pairs, data chunks, and so forth.

An implementation framework module 130 may be used to implement native programs 105 seamless and efficiently on the high performance computing platform 110. Details regarding the implementation framework module 130 are further explained in this disclosure.

User computing devices 135 of the high performance computing platform 110 may receive output from the high performance computing platform 110 in the form of results, reports, corrected images, etc. Applications and services 137 may also receive output data from the high performance computing platform 110 either directly or indirectly.

Figure 5:
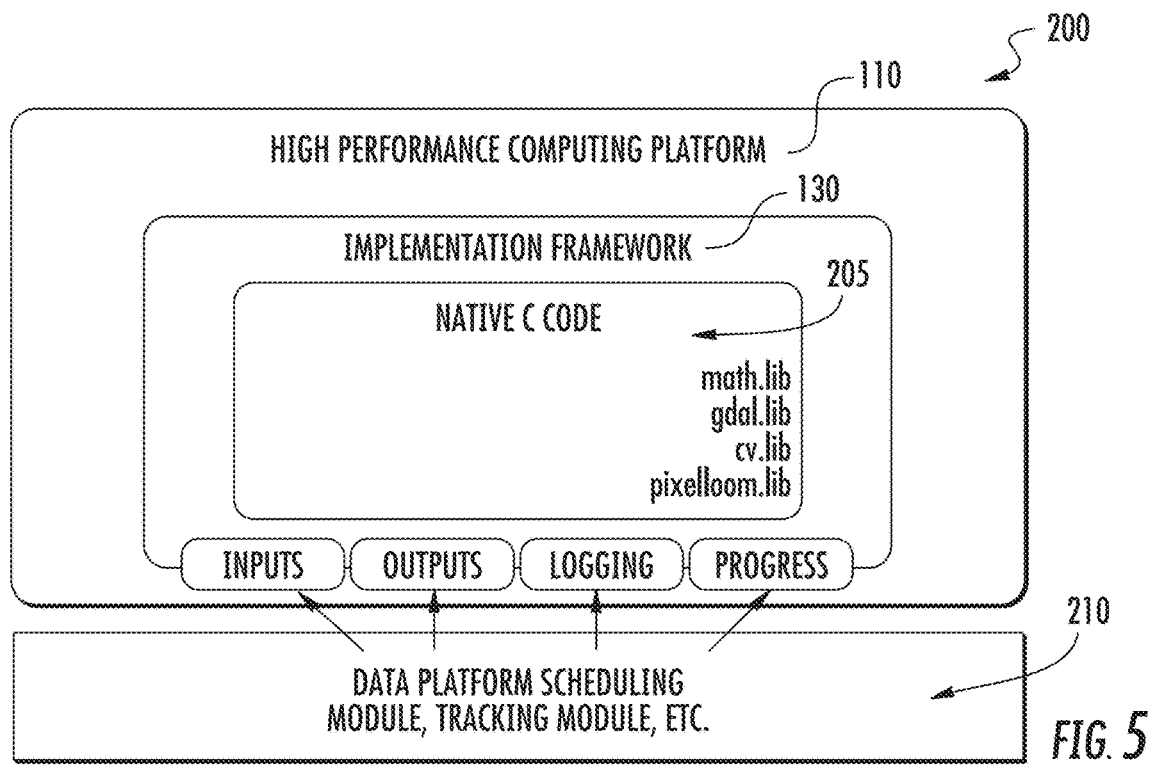
FIG. 5 illustrates a block diagram of an example embodiment of a data platform for data storage and processing and an implementation framework for executing native programs on the data platform.

FIG. 5 illustrates a block diagram of an example embodiment of a data platform for data storage and processing and an implementation framework for executing native programs on the data platform. The system 200 includes various hardware and software computing components. Depending on the embodiment, the high performance computing platform 110 may be a proprietary network-based computing environment, an industry-standard server cluster, or a system that implements an open-source high performance computing system solution such as Apache™ Hadoop® (available from the Apache Software Foundation, Delaware). The implementation framework 130 allows developers to run native programs, such as the native C code 205 in this embodiment, using the high performance computing platform 110. This enables large-scale deployment of advanced data processing applications by pairing the performance and flexibility of natively developed algorithms in the native C code 205 with the unfettered scalability and throughput inherent in the implementation framework 130.

One of the reasons why the native program, such as native C code 205 may have been written in C or C++ instead of programming language such as Java is that C/C++ are superior for memory and CPU intensive applications. For scientific calculations, data analysis, and machine learning purposes, Java's memory performance is poor in comparison with C/C++. Moreover, in managing large in-memory map of key/value pairs, Java can be on the order of two to three times worse in terms of memory performance.

In terms of CPU resource usage and performance, C/C++ can be also superior than Java. Traversing and managing key/value pairs, maps, etc., can consume a lot of CPU time. Given Java's inefficient use of memory with regard to these maps, the processor caches may be made less effective. Therefore, for applications that demand high level memory optimization, Java can be a poor choice.

Because some high performance computing platform 110 may not be written or implemented in C/C++, it is difficult to easily deploy C/C++ programs on these platforms without customizing the native programs and/or painstakingly adding tracking, piping, logging, and reporting functions. The implementation framework 130, however, makes integrating the native programs with the high performance computing platform 110 easy.

Figure 6:
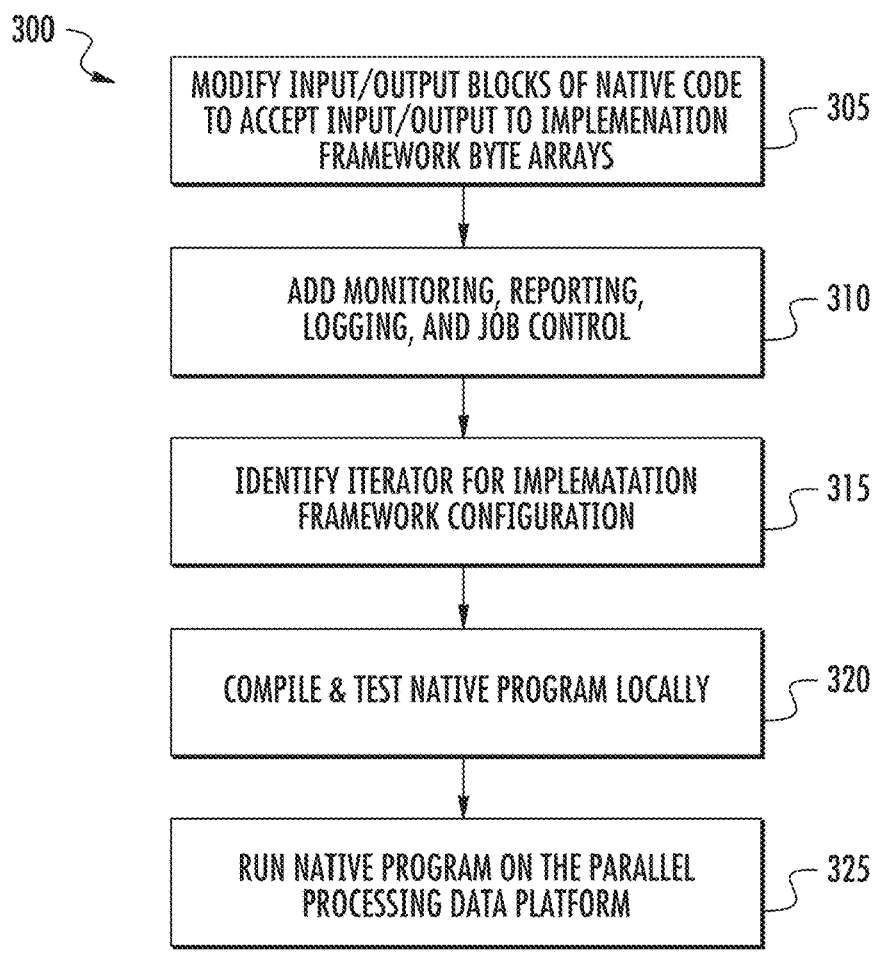
FIG. 6 illustrates a flow chart of some embodiments of a method for implementing native software programs on parallel processing high performance data platforms.

Examples of Implementing Native Programs on High Performance Computing Platforms FIG. 6 illustrates a flow chart of some embodiments of a method for implementing native software programs on parallel processing high performance data platforms. The method 300 begins at block 305, wherein the input/output blocks of native program code is modified to accept the input/output byte arrays of the implementation framework (also referred to as "BusBoy" herein). Depending on the embodiment, this can be done by swapping the current I/O functions of the native programs for the implementation framework 130's functions. For example, using the BusBoy (also referred to as "implementation framework module 130") namespace, an input function may be added by executing algorithm→addInputDataset ("input1"), wherein "input1" is the input byte array. Similarly, algorithm→addOutputDataset ("output") may add "output," the output byte array. By extending the algorithm class in the implementation framework and specifying the input/output blocks to read/write the byte arrays in the implementation framework 130, the native program's algorithms may be defined in the implementation framework. Moreover, in some embodiments, Uniform Resource Identifiers (URIs) and/or other syntaxes can be used to track the location of the input data, including the input byte arrays.

In some embodiments, the algorithms used by the native programs include clustering algorithms, classification algorithms, and other types of machine learning and/or image-processing related algorithms. These algorithms include both proprietary programs and open-source programs. Furthermore, physical computing nodes on the high performance computing platform 110 may include nodes that are dynamically assigned for executing such algorithms, such as notes dynamically assigned for clustering purposes. When there is increased need due to complex or more demanding computing, more nodes may be dynamically added for computing needs.

Furthermore, additional information regarding the input and output of the native programs may also be defined. For example, the type of the input/output data may be specified as TIFF, JPG, etc. Metadata related to input/output data may also be defined.

In another example, the input can be specified by extending an input class in the BUSBOY namespace and then specifying the location or name of the input file, such as BUSBOY::Dataset*inputRedImgs=m_data.getInputDataset ("red_images). Similarly, the output dataset can be specified using a function call such as BUSBOY::DataFile*NDVIFile=new BUSBOY::DataFile( ) These examples are for illustrated purposes only. In some embodiments, besides specifying input and output, the number of expected dimensions of the data may also be specified using syntax such as algorithm→addExpectedDimension(DataKeyDimension ("dim1")). Moreover, further details regarding each dimension may be defined in the configuration file. For example, name of the first dimension may be specified as "dim1." Further information about a dimension, such as whether this is a dimension that can be split may also be specified in a configuration file.

The method 300 then proceed to block 310, wherein monitoring, scheduling, reporting, logging, and job control related modules may be added. In some embodiments, all such modules may be added. In some embodiments, only one or a few such modules are added. In some embodiments, this allows the native programs to be executed on the high performance computing platform 110 with hooks back to the platform processes so that progress may be tracked. Moreover, the Java scheduler processes that may be used to identify best locations for deploying certain jobs can also be included in the scheduling module. The job control module may cancel, start, or pause a certain job or a certain process. For example, logging may be achieved by using the following syntax: m_context.log (BUSBOY::Logger:INFO, "NDVI execution"), with specific information about the standard/condition for logging some results.

In some embodiments, besides modules for monitoring, scheduling, reporting, logging, and job control, other modules can also be added in the implementation framework to enable the execution of native programs on the high performance computing platform. For example, errors may be either logged or reported according to the user's specification. Moreover, other functions such as geographic location management for jobs, which may include choosing the ideal location for deploying jobs and prioritizing jobs, may also be included in the above modules or other additional functional modules.

The method 300 then proceeds to block 315, wherein an iterator is identified in a configuration file for the implementation framework. The configuration file may also include such information as: the identification of the executable native code, the identification of the input/output data, and so forth. In some embodiments, the only information that the implementation framework needs to know about the native code are included in the configuration file to ensure maximum privacy, security, and control of the native program code. This may be desirable in cases where the native code is a trade/commercial secret or of high security importance.

Depending on the embodiment, the configuration file may be written or represented in various different languages, such as JSON, WL, and other open source or a proprietary standards for specifying key/value pairings. For example, using JSON, the implementation file may specify the location of the input file using key/value pairs such as "location": "path/to/input/directory." It can similarly specify where the native code is located, output directory, and other information that is relevant to execution of the native program on the high performance computing platform 110.

The method 300 then proceeds to block 320, wherein the native program may be compiled and tested locally in a smaller scale cluster environment before being deployed on a large scale on the high performance computing platform 110. In some embodiments, this process also involves compile the native program into a shared object, and testing the compiled native program locally on several gigabytes of data first. After successful testing, the native program may be deployed using the implementation framework 130 on the high performance computing platform 110 to handle terabytes or even petabytes of data.

In some embodiments, the user may also choose to run the program "locally" on more simple industry-standard level computing clusters but still retain the benefit of using the implementation framework module 130. The native programs do not have to be re-written to suit the particular computing cluster that is going to run the native program with the help of the implementation framework module 130.

The method 300 then proceeds to block 325, wherein the native program may be deployed on a high performance computing platform 110, such as a parallel-processing data platform, the Apache™ Hadoop platform, other proprietary or open-source high performance computing platforms, and so forth.

Unlike some other ways of extending the native programs for running on high performance computing platforms, the implementation framework 130 does not have to see any source code in the native programs. A user's proprietary algorithms can remain completely proprietary. Moreover, native programs that do not have the functions to utilize processing cluster's scales can be made scalable under the implementation framework 130.

In addition, complex workflows that are difficult to build into native programs may be added by the implementation framework 130, which interacts with both the input/output of the native programs and the underlying system monitoring and job deployment tools of the high performance computing platform 110. The implementation framework 130 may also publish processing results into an index creation tool.

Examples of Embodiments for Execution of Native Programs

Figure 7:
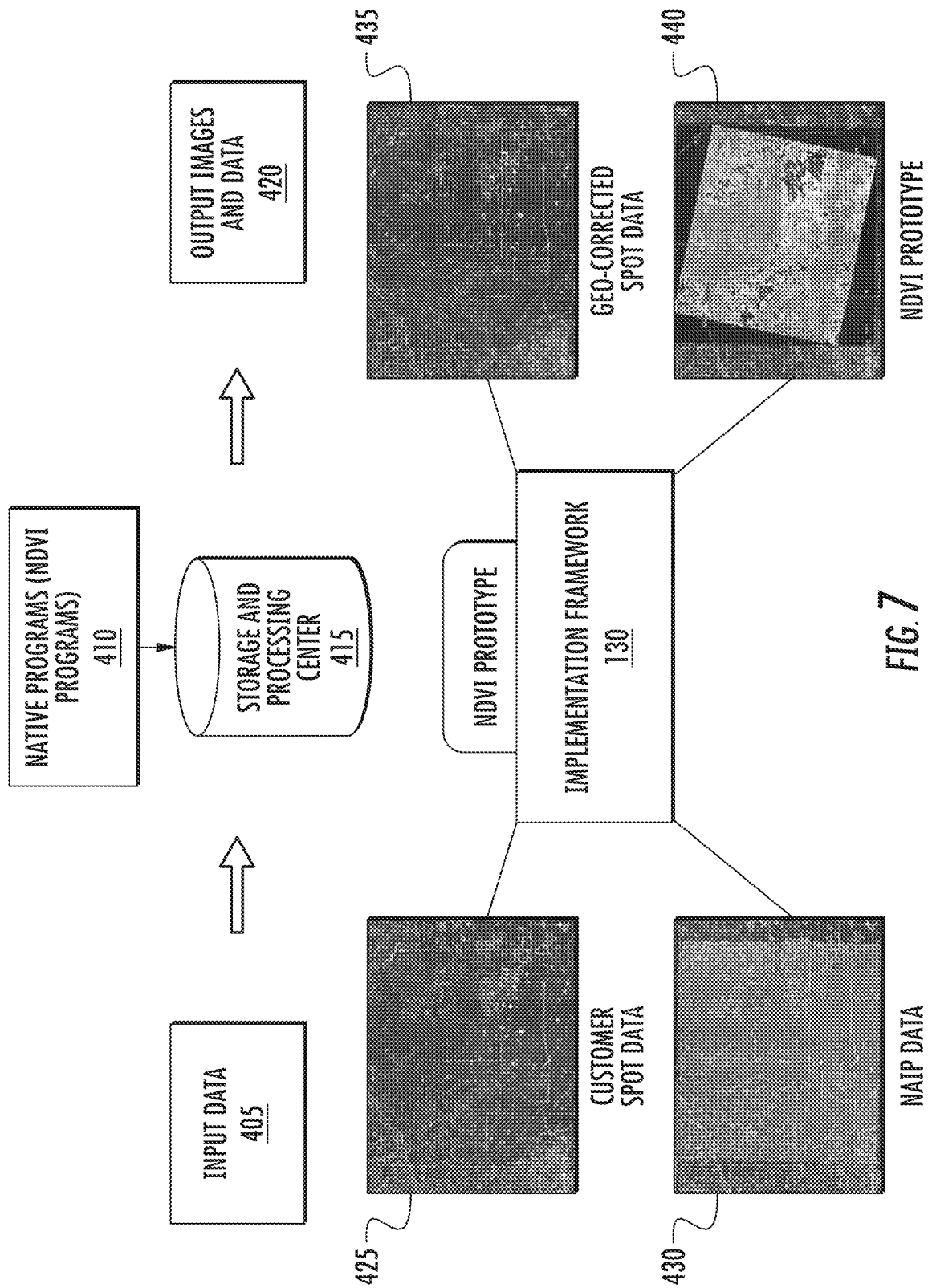
FIG. 7 illustrates a block diagram of an example embodiment of an implementation frame work for executing native programs and its application in geospatial image data processing.

FIG. 7 illustrates a block diagram of an example embodiment of an implementation frame work for executing native programs for NDVI (Normalized Difference Vegetation Index) purposes and the native programs' application in geospatial image data processing. In this example, satellite imaging data available over more than 10 years globally are used for analysis. This includes terabytes of imaging data. The input data 405, is first loaded into the storage and processing center 415. In some embodiments, the storage and processing center 415 can be a high performance computing platform 110, a program execution service, a set of industry-level servers, a computing cluster, and so forth. Native programs 410 may interact with data in the storage and processing center 415 with the help of the implementation framework module 130. In this particular embodiment, the native programs 410 are NDVI (Normalized Difference Vegetation Index) programs, which can be used to analyze image and sensing data taken from space. The input data 405 in this example may include customer SPOT data 425 and NAIP (National Agricultural Imaging Program) data 430. The customer SPOT 425 data may come from the satellite and mini-satellite images taken for the particular customer. The NAIP data 430 may include NAIP coverage maps, contractor maps, and so forth. The input data 405 may include other data as well, depending on the embodiment.

Using the implementation framework module 130, a customer's proprietary NDVI program 410 can be compiled and executed by the customer and can run on a high performance computing platform 110. The image can be analyzed, the jobs on the high performance computing platform 110 may be controlled, monitored, distributed according to geographic location and/or other considerations, and logged. After the native programs 410 or part of the native programs 410's execution is completed, the output image and data 420 may be obtained. In this particular example, the output images and data 420 include geo-corrected SPOT data 435 and NDVI prototype data and images 440.

Figure 8:
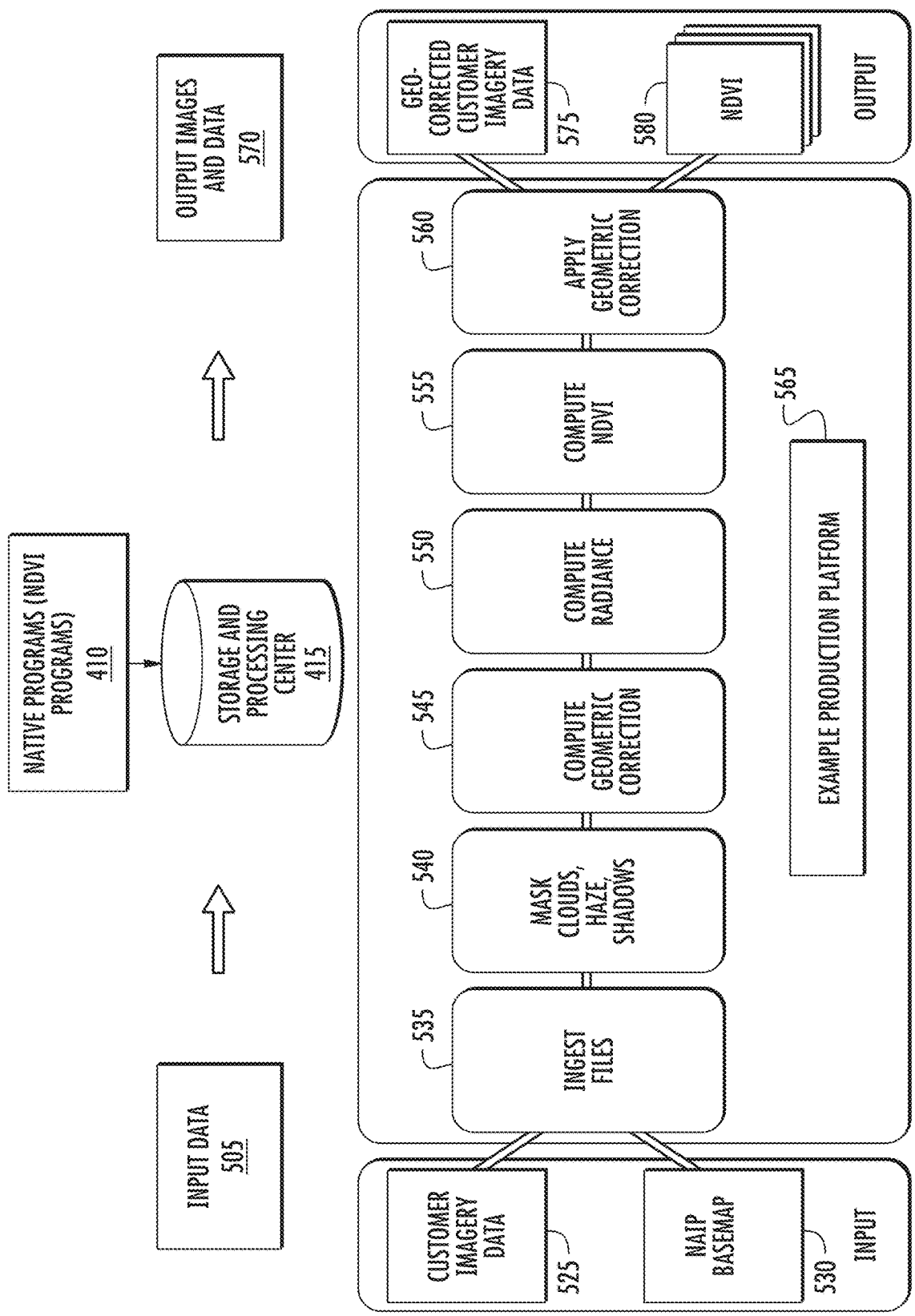
FIG. 8 illustrates a block diagram of an example production system using the implementation framework for executing native programs on a high performance parallel computing platform for geospatial data processing.

FIG. 8 illustrates a block diagram of an example production system using the implementation framework for executing native programs on a high performance parallel computing platform for geospatial data processing. In this example, similar computing hardware, such as storage and processing center 415, may be used. In some embodiments, the storage and processing center may be a high performance computing platform 110. In some other embodiments, it may also include large-scale storage devices, proprietary program execution services, and existing open-source solutions such as Apache™ Hadoop. As in FIG. 7, native programs such as NDVI programs may be executed on the storage and processing center 415 with the help of the implementation framework module 130.

In this example, the input data 505 includes customer imagery data 525 and NAIP basemap data 530. The input data 505 may also include other types of data, depending on the embodiment. The data may be stored in the storage and processing center 415, which may include a high performance computing platform 110 and/or other types of data storage and processing devices. In this example, the input data 505 is stored and process in an example production platform 565, which is stored in a high performance computing platform 110. The production platform 565 includes a module for ingesting files 535. It also includes a module for masking clouds, haze, and shadows, which are often present in customer imagery data 525 and NAIP basemap data 530. After extending the BUSBOY namespace, native programs to mask clouds, haze, and shadows may be executed via the implementation framework module 130 on the production platform 565. The production platform 565 also includes a module to compute geometric correction 545, with the help of the implementation framework module 130, which helps execute the native programs. The production platform also includes a module to compute radiance 550. Next, the native programs to compute NDVI 555 may be executed with the help of the implementation framework on the production platform. Finally, a module to apply geometric correction 560 that was previously computed in the module 545 may be executed. The output images and data 570 may then be generated. In this particular example, the output images and data 570 may include geo-corrected customer imagery data 575 and NDVI data 580.

Examples of Implementation Mechanisms for
Executing Native Programs

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
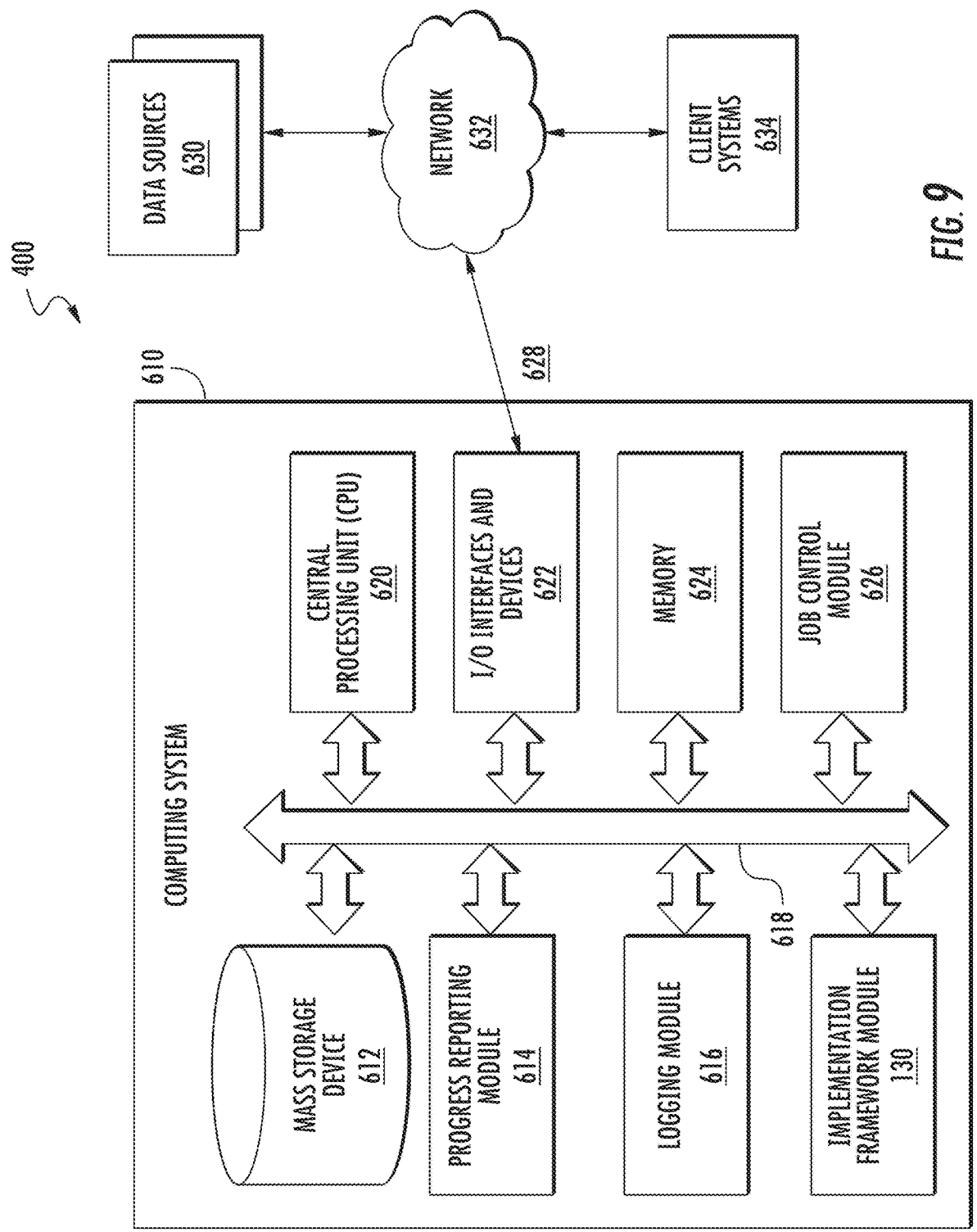
FIG. 9 illustrates a computer system with which certain methods and modules discussed herein may be implemented.

For example, FIG. 9 is a block diagram that illustrates a computer system 610 upon which an embodiment may be implemented. Computer system 610 includes a bus 618 or other communication mechanism for communicating information, and a hardware processor, or multiple processors, 620 coupled with bus 618 for processing information. Hardware processor(s) 620 may be, for example, one or more general purpose microprocessors.

Computer system 610 also includes a main memory 624, such as a random access memory (RAM), cache and/or other dynamic storage devices, coupled to bus 618 for storing information and instructions to be executed by processor 620. Main memory 624 also may be used for storing temporary variables or other intermediate information during execution of instructions to be executed by processor 620. Such instructions, when stored in storage media accessible to processor 620, render computer system 610 into a special-purpose machine that is customized to perform the operations specified in the instructions.

Computer system 610 further includes a read only memory (ROM) or other static storage device coupled to bus 618 for storing static information and instructions for processor 620. A storage device 612, such as a magnetic disk, optical disk, or USB thumb drive (Flash drive), etc., is provided and coupled to bus 618 for storing information and instructions.

Computer system 610 may be coupled via bus 618 to a display, such as a cathode ray tube (CRT) or LCD display (or touch screen), for displaying information to a computer user. An input/output interface and device 622, including alphanumeric and other keys, is coupled to bus 618 for communicating information and command selections to processor 804. Another type of user input device is cursor control, such as a mouse, a trackball, or cursor direction keys for communicating direction information and command selections to processor 620 and for controlling cursor movement on display. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 610 may include an implementation framework module 130 that may be stored in a mass storage device as executable software codes that are executed by the high performance computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 610 may further include a progress reporting module 614, logging module 616, and job control module 626, for purposes of canceling jobs, starting jobs, distributing jobs geographically or according to time, and logging, reporting, etc.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 610 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 610 in response to processor(s) 620 executing one or more sequences of one or more instructions contained in main memory 625. Such instructions may be read into main memory 624 from another storage medium, such as storage device 612. Execution of the sequences of instructions contained in main memory 624 causes processor(s) 620 to perform the process steps described herein or sometimes through the help of the implementation framework module 130. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 618. Transmission media can also take the form of acoustic or light waves, such as those generated during radio-wave and infra-red data communications.

Various forms of media may be involved in carrying one or more sequences of one or more instructions to processor 620 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 618. Bus 618 carries the data to main memory 624, from which processor 620 retrieves and executes the instructions. The instructions received by main memory 624 may retrieve and executes the instructions. The instructions received by main memory 624 may optionally be stored on storage device 612 either before or after execution by processor 620.

Computer system 610 also includes a communication interface 628 coupled to bus 618. Communication interface 628 provides a two-way data communication coupling to a network link 632 that is connected to a local network and to a client system 634 and data sources 630. For example, communication interface 628 may be an integrated services digital network (ISDN) card, cable modem, satellite modem, or a modem to provide a data communication connection to a corresponding type of telephone line. As another example, communication interface 628 may be a local area network (LAN) card to provide a data communication connection to a compatible LAN (or WAN component to communicated with a WAN). Wireless links may also be implemented. In any such implementation, communication interface 628 sends and receives electrical, electromagnetic or optical signals that carry digital data streams representing various types of information.

Network link 632 typically provides data communication through one or more networks to other data devices. For example, network link 632 may provide a connection through local network to a host computer, a client system 634, or to data equipment operated by an Internet Service Provider (ISP). ISP in turn provides data communication services through the world wide packet data communication network now commonly referred to as the "Internet" 828. Local network and Internet both use electrical, electromagnetic or optical signals that carry digital data streams. The signals through the various networks and the signals on network link 632 and through communication interface 818, which carry the digital data to and from computer system 610, are example forms of transmission media.

Computer system 610 can send messages and receive data, including program code, through the network(s), network link 632 and communication interface 628. In the Internet example, a server might transmit a requested code for an application program through Internet, ISP, local network and communication interface 628.

The received code may be executed by processor 620 with the help of the implementation framework module 130, and/or stored in storage device 612, or other non-volatile storage for later execution.

Example Network of Imaging Micro-Satellites

Referring again to FIG. 2, a representation of an example constellation of imaging micro-satellites 10 in a low-earth orbit, a control system 14, a ground communication system 16, and a desired location image area 18 is illustrated. The high performance computing platform 110 can be configured to receive and/or analyze data (e.g., imagery) obtained by the constellation 10. In some embodiments, the control system 14 comprises the high performance computing platform 110.

Embodiments of the systems and methods described herein (e.g., as described with reference to FIGS. 4-9) can be used to process imagery collected with the constellation 10. The collected imagery can include video, still images, etc. In some implementations, the imaging satellites 12 can include an image acquisition system configured to acquire multispectral and/or pan-spectral images or videos of the desired location image area 18. The imaging micro-satellites 12 can be owned and/or operated by a single entity or multiple entities. In various implementations, the constellation 10 may include 2, 4, 8, 10, 12, 16, 24, 30, or some other number of satellites. Although FIG. 10 shows an example constellation of micro-satellites 12, in other implementations the constellation 10 can include additional or different types of satellites including telecommunications satellites, mini-satellites, nano-satellites, and so forth.

CONCLUSION

Examples of satellite access window calculation systems and associated components and methods have been described with reference to the figures. The figures show various systems and modules and connections between them. The various modules and systems can be combined in various configurations and connections between the various modules and systems can represent physical or logical links. The representations in the figures have been presented to clearly illustrate the principles of how to produce desirable schedules in a relatively quick and efficient manner, and details regarding divisions of modules or systems have been provided for ease of description rather than attempting to delineate separate physical embodiments. Additionally, the representations in the figures have been presented to clearly illustrate the principles of calculating satellite access windows for a constellation of imaging satellites in a relatively quick and efficient manner, and details regarding divisions of modules or systems have been provided for ease of description rather than attempting to delineate separate physical embodiments. The examples and figures are intended to illustrate and not to limit the scope of the inventions described herein. For example, the principles herein may be applied to a constellation of satellites wherein satellites include communication satellites, imaging satellites, Earth observation satellites, navigational satellites, weather satellites, or other types of satellites. The satellites can be any of a variety of sizes such as large satellites, medium satellites, mini-satellites, micro-satellites, nano-satellites, pico-satellites, and the like. The principles disclosed herein may be applied to systems that do not comprise a constellation of imaging satellites such as, e.g., air traffic control systems, vehicle routing systems, and so forth.

Each of the processes, methods, and algorithms described in the present application may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network (e.g., a terrestrial and/or satellite network) or any other type of communication network.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to manage execution of one or more native programs, the system comprising:
   one or more physical computing devices having a hardware processor and a computer memory, the computer memory configured to store one or more program modules for executing the one or more native programs;
   an implementation framework system stored in the computer memory, wherein the implementation framework system is configured to:
      automatically access a request from a user to execute the one or more native programs on a high performance computing system, wherein the high performance computing system comprises a plurality of physical computing nodes; and
      in response to the request from the user;
         configure one or more input byte arrays to store input of the one or more native programs;
         configure one or more output byte arrays to store output of the one or more native programs;
         create a configuration file that identifies the one or more native programs, the input byte arrays, the output byte arrays, and an iterator, wherein the configuration file enables an execution of the one or more native programs on the high performance computing system, wherein the configuration file comprises a location of an input directory and a location of an output directory;
         communicate with one or more modules for progress reporting, logging, or job control on the high performance computing system; and
         execute the one or more native programs on the high performance computing system based, at least in part, on the configuration file, wherein the one or more native programs are modified to accept the one or more input byte arrays and the one or more output byte arrays.

2. The computing system of claim 1, wherein the module for logging is further configured to record data that is processed on the high performance computing system.

3. The computing system of claim 1, wherein the module for progress reporting is further configured to report execution data related to the one or more native programs.

4. The computing system of claim 1, wherein the module for job control is further configured to start, stop, pause, and cancel one or more of the one or more native programs on the high performance computing system.

5. The computing system of claim 1, wherein the high performance computing system is configured to execute the one or more native programs in parallel using the implementation framework system.

6. The computing system of claim 1, wherein the high performance computing system is configured to execute a programming language that is different from the one or more native programs.

7. The computing system of claim 1, wherein the implementation framework system is configured to keep the contents of the one or more native programs confidential.

8. The computing system of claim 1, wherein the one or lore native programs are further configured to process geospatial imaging data.

9. The computing system of claim 1, wherein the implementation framework system is further configured to use uniform resource identifiers to track the input byte arrays.

10. The computing system of claim 1, wherein the configuration file is further configured to comprise at least one of a number of expected dimensions or details related to the expected dimensions.

11. The computing system of claim 1, wherein the computing system further comprises physical computing nodes dynamically assigned for clustering.

12. A computer implemented method of managing execution of one or more native programs comprising:
   automatically accessing a request from a user to execute the one or more native programs on a high performance computing system, wherein the high performance computing system comprises a plurality of physical computing nodes; and
   in response to the request from the user:

configuring one or more input byte arrays to store input of the one or more native programs;

configuring one or more output byte arrays to store output of the one or more native programs;

creating a configuration file that identifies the one or more native programs, the input byte arrays, the output byte arrays, and an iterator, wherein the configuration file enables an execution of the one or more native programs on the high performance computing system wherein the configuration file is configured to comprise at least one of a number of expected dimensions, details related to the expected dimensions, or a location of an input directory and a location of an output directory;

communicating with one or more modules for at least one of progress reporting, logging, or job control on the high performance computing system; and executing the one or more native programs on the high performance computing system based, at least in part; on the configuration file, wherein one or more input functions and one or more output functions of the one or more native programs are modified to accept the one or more input byte arrays and the one or more output byte arrays.

13. The computer-implemented method of claim 12, further comprising recording, via the module for logging, data that is processed on the high performance computing system.

14. The computer-implemented method of claim 12, further comprising reporting, via the module for reporting, execution data related to the one or more native programs.

15. The computer-implemented method of claim 12, wherein the module for job control is configured to start, stop, pause, and cancel one or more of the one or more native programs on the high performance computing system.

16. The computer-implemented method of claim 12, wherein the high performance computing system is configured to execute the one or more native programs in parallel using the implementation framework system.

17. The computer-implemented method of claim 12, wherein the high performance computing system is configured to execute a programming language that is different from the one or more native programs.

18. The computer-implemented method of claim 12, wherein the one or more native programs are configured to process geo-spatial imaging data.

19. A computing system configured to manage execution of one or more native programs, the system comprising:

one or more physical computing devices having a hardware processor and a computer memory, the computer memory configured to store one or more program modules for executing the one or more native programs;

an implementation framework system stored in the computer memory, wherein the implementation framework system is configured to:

automatically access a request from a user to execute the one or more native programs on a high performance computing system, wherein the high performance computing system comprises a plurality of physical computing nodes; and in response to the request from the user:

configure one or more input byte arrays to store input of the one or more native programs, wherein the implementation framework system is configured to use uniform resource identifiers to track the input byte arrays;

configure one or more output byte arrays to store output of the one or more native programs;

create a configuration file that identifies the one or more native programs, the input byte arrays, the output byte arrays, and an iterator, wherein the configuration file enables an execution of the one or more native programs on the high performance computing system;

communicate with one or more modules for progress reporting, logging, or job control on the high performance computing system; and execute the one or more native programs on the high performance computing system based, at least in part, on the configuration file, wherein the one or more native programs are modified to accept the one or more input byte arrays and the one or more output byte arrays.

* * * * *